UNITED STATES PATENT OFFICE.

WILLIAM G. F. SIEGMANN, OF BALTIMORE, MARYLAND, ASSIGNOR TO THE SAGAK WOOD COMPANY, OF BALTIMORE, MARYLAND, A CORPORATION OF DELAWARE.

COMPOSITION OF MATTER.

960,422.　　　Specification of Letters Patent.　　Patented June 7, 1910.

No Drawing.　　　Application filed June 3, 1909.　Serial No. 500,796.

*To all whom it may concern:*

Be it known that I, WILLIAM G. F. SIEGMANN, a subject of the German Emperor, and resident of Baltimore, State of Maryland, have invented certain new and useful Improvements in Compositions of Matter, of which the following is a specification.

This invention relates to composition of matter for use in making brewery and other floors, paving blocks, floor arches, partition blocks, electric switch boards, panel box linings, and other electrical appliances, doors, door trimmings and linings, stair treads, table tops, pipe coverings, fire shutters and insulating material, though I do not wish to be limited with respect to its use or to the articles formed therefrom.

An object of this invention is to produce a non-conducting material which will not become brittle and which will not readily disintegrate when vibrated and a further object of the invention is the production of a non-combustible material which may be used in the construction of fire proof buildings or for articles of manufacture some of which have been enumerated.

In carrying the invention into practice, I utilize straw, preferably ground rather fine, and in some instances pulverized straw may be used to advantage. I also employ cement and liquefied asphaltum which latter ingredient in addition to acting as a binder, aids in retaining the mass in a somewhat elastic state, that is to say, the presence of the asphaltum prevents disintegration when vibrated or subjected to blows such as are given by the contact of horses' shoes. Then I employ boracic acid, which ingredient is used to control the setting process and at the same time increase its fire-proofing qualities. I furthermore employ in connection with the straw, cement, asphaltum and boracic acid, an auxiliary binding agent consisting of chlorid of magnesium. For use in making paving blocks, street surfaces, floors, etc., I employ in connection with the above named ingredients, crushed stone, gravel or stone dust.

When the compound is to be used for floor arches, partition blocks, switch boards, panel boxes, linings, and electrical appliances, doors, door trimmings and linings, stair treads, table tops, pipe coverings, fire shutters, or for plastering or insulating purposes, I have found the following proportions to produce the best results for general use: 50 pounds straw, 65 pounds cement (calcined magnesite), 1 and 1/2 gallons asphaltum, 10 gallons chlorid of magnesium (20° B.), 10 ounces boracic acid.

When the compound is to be used for construction of buildings, road beds, street and floor surfaces, paving blocks, etc., the following proportions and process of mixing are found to produce the best results: 50 pounds straw, 70 pounds cement (calcined magnesite), 5 gallons asphaltum, 6 gallons chlorid of magnesium (20° B.), 5 ounces boracic acid.

The general ingredients are thoroughly mixed and added to crushed stone or gravel and cement moistened with chlorid of magnesium. In compounding the ingredients, one part of commingled straw, cement, asphaltum, boracic acid and chlorid of magnesium are mixed with two parts of crushed stone or gravel. Before adding the stone, it should be dampened with chlorid of magnesium and a small amount of cement should be added to the stone, preferably in the proportion of one-half gallon of chlorid of magnesium to two pounds of cement and one hundred pounds of stone. The dampened stone and cement are mixed with the straw, cement, asphaltum, boracic acid and chlorid of magnesium in the proportion stated.

I claim—

1. A composition of matter for producing articles of manufacture consisting of cut straw, calcined magnesite, asphaltum and chlorid of magnesium and boracic acid in the proportion of 50 pounds of straw, 70 pounds of calcined magnesite, 5 gallons of asphaltum, 6 gallons of chlorid of magnesium and 10 ounces of boracic acid.

2. A composition of matter for building material consisting of straw, calcined magnesite, asphaltum, chlorid of magnesium and boracic acid in combination with a mixture of stone, calcined magnesite and chlorid of magnesium.

3. A composition of matter for building material consisting of a mixture of 50 pounds of straw, 70 pounds of calcined magnesite, 5 gallons of asphaltum, 6 gallons of chlorid of magnesium and 10 ounces of boracic acid in combination with a mixture of 100 pounds of stone, 2 pounds of calcined magnesite and one-half gallon of chlorid of magnesium.

In testimony whereof, I affix my signature in the presence of two witnesses.

WILLIAM G. F. SIEGMANN.

Witnesses:
J. ALEX HILLEARY, Jr.,
BENJ. W. SMITH.